(12) United States Patent
Kleiber

(10) Patent No.: US 11,352,266 B2
(45) Date of Patent: Jun. 7, 2022

(54) METHOD AND SYSTEM FOR CONTROLLING DISINFECTION IN RECIRCULATING WATER SYSTEMS

(71) Applicant: Evoqua Water Technologies GmbH, Günzburg (DE)

(72) Inventor: Wolfgang Kleiber, Ichenhausen (DE)

(73) Assignee: Evoqua Water Technologies LLC, Pittsburgh, PA (US)

( * ) Notice: Subject to any disclaimer, the term of this patent is extended or adjusted under 35 U.S.C. 154(b) by 144 days.

(21) Appl. No.: 16/637,160

(22) PCT Filed: Aug. 7, 2018

(86) PCT No.: PCT/EP2018/071411
§ 371 (c)(1),
(2) Date: Feb. 6, 2020

(87) PCT Pub. No.: WO2019/030232
PCT Pub. Date: Feb. 14, 2019

(65) Prior Publication Data
US 2020/0369534 A1    Nov. 26, 2020

Related U.S. Application Data

(60) Provisional application No. 62/542,490, filed on Aug. 8, 2017.

(51) Int. Cl.
| | | |
|---|---|---|
| *C02F 1/00* | (2006.01) | |
| *C02F 1/66* | (2006.01) | |
| *C02F 1/76* | (2006.01) | |
| *C02F 103/42* | (2006.01) | |

(52) U.S. Cl.
CPC ............... *C02F 1/008* (2013.01); *C02F 1/66* (2013.01); *C02F 1/76* (2013.01); *C02F 2103/42* (2013.01); *C02F 2209/006* (2013.01); *C02F 2209/04* (2013.01); *C02F 2209/06* (2013.01); *C02F 2209/29* (2013.01); *C02F 2209/40* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 2006/0169646 A1 | 8/2006 | Andree et al. | |
| 2014/0048470 A1* | 2/2014 | Lalli | C02F 9/00 |
| | | | 210/243 |

* cited by examiner

*Primary Examiner* — Richard C Gurtowski

(57) ABSTRACT

The present invention relates to a method and system for controlling disinfection in recirculating water systems and a method for retrofitting a recirculation system.

23 Claims, 5 Drawing Sheets

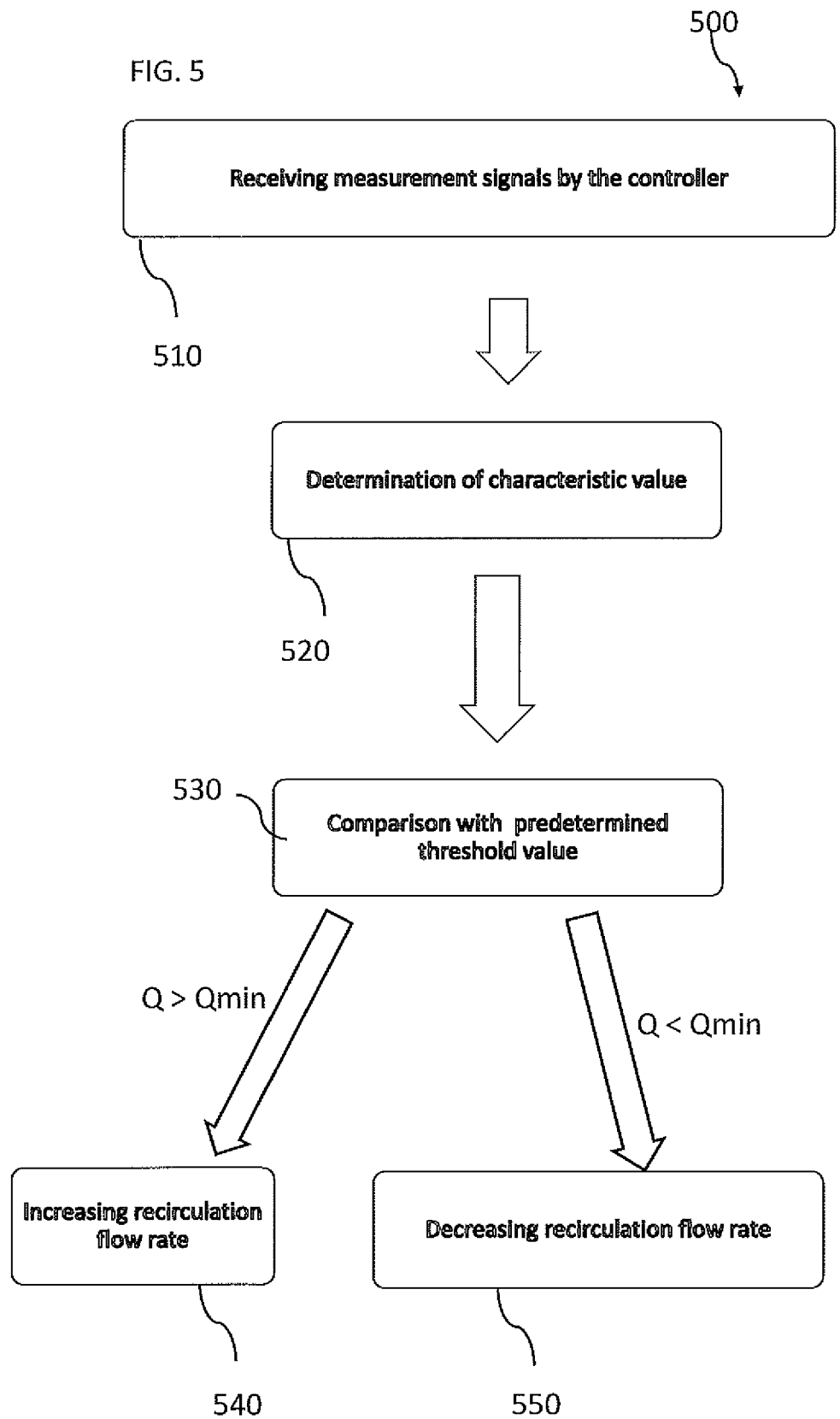

METHOD AND SYSTEM FOR CONTROLLING DISINFECTION IN RECIRCULATING WATER SYSTEMS

BACKGROUND

Control systems or methods for disinfection are known to be employed for aquatic facilities as spas or pools for swimming, bathing or wading or any other water body for recreation or hydrotherapy. It is common in most pool facilities that the pool water is recirculated by a motor driven pump so that the pool water can be continuously or intermittently filtered and optionally pass through a suitable heater to maintain the water substantially free of debris including particulates and at the same time maintain a selected temperature by means of the heater.

Pool water can be kept substantially free from bacteria, viruses or algae or the biological activity can at least be reduced by the addition of certain selected chemical compounds or disinfecting species. The introduction of a disinfectant can be performed for example by introducing liquid or gaseous chlorine or sodium hypochlorite or calcium hypochlorite either in its crystalline form or in solution in a quantity sufficient under given conditions to yield a level of free chlorine which will at least inhibit the growth of or destroy those contaminants.

However, chlorine may produce by-products such as combined chlorine or chloramines, which are responsible for the typical smell in pool halls. Such combined chlorine is undesirable, because it can irritate skin or eyes. To minimize such negative side effects due to chlorine predetermined maximum values are given. It is therefore necessary to control the chlorine value in a definable range being limited by predetermined minimum and maximum values.

Pool water quality guidelines including disinfectant concentration vary around the globe. In Germany for example the chlorine concentration should be maintained between 0.3 and 0.6 mg/L in pool water and between 0.7 and 1.0 mg/L for hot tubs according to DIN 19643 (guidelines from the German Institute for Standardization).

Common control devices use observations methods, which compare water parameter as chlorine concentration ($Cl_2$) and pH and occasionally combined chlorine to fixed limit values. Based on such an analysis, a typical control device uses simple on/off control modes responding by intermittent changes of the set point of a parameter such as chlorine. Is the control system in operation a reduced value of a disinfectant can be set if the chlorine concentration is found to be too high.

It is also possible to control the chlorine concentration based on an oxidation-reduction potential (ORP) set point to a certain defined range. Oxidizers cause the millivolt value to increase and therefore increase disinfection. Typical oxidizers are hypochlorous acid (a component of free chlorine), ozone, hydrogen peroxide, and potassium monopersulfate. The ORP correlates to the potential of the water to inactivate micro-organisms and oxidize organic materials. Organic loading can for example be increased if bathers enter the pool.

There are recommended predetermined minimum ORP values according to local government regulations, wherein e.g. for Germany the ORP measurement should be at least 750 mV. An oxidation-reduction potential (ORP) based operation of an aquatic water purification apparatus and control is known from the German patent DE 19844179 B4, which is incorporated by reference. Information regarding another system and method for treating water is found in US 2006/0169646 incorporated by reference herein in its entirety for all purposes. However, said methods have no effect on the recirculation water rate of the water.

Power consumption by a recirculating water system especially by the pumping devices can be considerable. A further disadvantage of common recirculation pumps is that they are oversized and are used in simple on/off modes. Techniques for efficiently using the energy in the system are therefore needed. Therefore in common pool and spa recirculation water systems that include disinfecting system there is a need to save energy and disinfectants.

SUMMARY OF THE INVENTION

It is an object of the present invention to provide cost reduction measures by ensuring that the operation of all control devices is optimized.

Moreover, it is an object to reduce both energy consumption and chemical usage. Chemical and energy savings allow for early return on investment and manpower savings due to lower chemical usage.

It is also an object to optimize the control method for the recirculation pump in order to extend its service life.

It is yet another object to provide an accurate, continuous and secure control system and method to ensure high pool water quality at all times.

These and other objects are met by methods, a computer readable medium and system in accordance with the independent claims. Other features of the system and methods according to the present invention are specified in the dependent claims and are discussed in further detail below. Preferred embodiments are disclosed in the dependent claims.

In accordance with one or more embodiments of the invention, the invention relates to a method for controlling disinfection in a recirculating water system, the method comprising the following method steps:
providing a controller comprising a processor for receiving a plurality of measurement signals of at least one water property sensor; determining at least one characteristic value based on the measurement signals from at least one oxidation-reduction potential sensor and at least one free chlorine sensor, said characteristic value based at least in part on a chlorine redox relationship; and comparing said at least one characteristic value with at least one predetermined threshold value and regulating based on a comparison value a water recirculation rate and/or a disinfectant level.

A further aspect of the present invention is directed to a method using an algorithm for determining the at least one characteristic value comprising a quality factor, wherein the step of comparing comprises continuously verifying whether the quality factor needs to be changed by regulation of a flow control device and/or a disinfecting system.

In another aspect of the present invention said quality factor is calculated by taking a square root of the ratio of measured free chlorine and an oxidation-reduction potential dependent chlorine reference value. This algorithm is represented by the following equation:

$$Q = \sqrt{\frac{Cl_{2\ measured}}{Cl_{2\ reference}}}$$

By continuously determining or calculating the water quality factor Q, the controller continuously learns what the actual water quality is. Dependent on a comparison of the actual factor Q with a predetermined minimum factor Q, the controller is able to decrease or alternatively increase the recirculation rate in a seamless or linear fashion. Thus a stepless method for controlling is provided. This is deemed as a good solution for saving energy without degrading the water quality.

In another aspect of the present invention the method further comprises the following steps:
receiving the chlorine reference ($Cl_{2reference}$) values (free chlorine in ppm) each with a corresponding reference oxidation-reduction potential value (in mV) and storing the reference value pairs in a lookup table, wherein the lookup table is stored in a memory. Further the method comprises the method step of retrieving based on the measured oxidation-reduction potential value from said lookup table the corresponding chlorine reference value or a chlorine reference value determined by an interpolation algorithm of two neighbouring chlorine reference values.

In yet another aspect of the present invention the method further comprises the following step: determining a characteristic chlorine redox curve for the measured water by using the quality factor and a mathematical formula and wherein the step of comparing comprises comparing the characteristic chlorine redox curve for the measured water to a predetermined chlorine redox curve of minimum water quality.

In this manner the controller can dependent on the ORP measurements and the chlorine measurements, and optionally of the pH measurements, calculate a quality dependent characteristic curve or line for pool water, which includes the quality factor. This current characteristic curve can be compared to a predetermined minimum chlorine redox curve. If the comparison shows no difference between the compared values a control signal is generated to maintain a target ORP value and/or target free chlorine value. If the comparison value shows that there is a difference between the curves, then a new control signal is generated to regulate the recirculation rate and/or the disinfectant level.

Another aspect of the invention the method step of regulating comprises adjusting the water recirculation rate based on at least one characteristic value selected from a group comprising the characteristic chlorine redox curve, the quality factor and/or lookup tables.

A further aspect of the invention comprises a method, wherein adjusting the water recirculation rate is done automatically by means of a recirculation pump comprising frequency converters. In other words the recirculation pump is fitted with a variable frequency drive.

By using frequency converters or variable frequency driven pumps for the recirculation pump the control method is optimized because the flow rate can be linearly controlled and an extended service life of the recirculation pump can be achieved.

In another aspect of the invention the method step of regulating comprises controlling a system to achieve a disinfectant concentration being greater than a predetermined lower threshold value and lower than a predetermined upper threshold value. Thus the invention provides means of maintaining the disinfection concentration within predetermined upper and low threshold values.

In this way predetermined threshold values or ranges according to local jurisdictions or regulations or recommendations can be met. For example according to German regulations, the predetermined limits for the disinfectant chlorine can be taken from the DIN 19643. According to said DIN the lower predetermined threshold for free chlorine is 0.3 mg/L and the upper predetermined threshold is 0.6 mg/L. Further, other threshold values can be controlled as for example the pH or the oxidation-reduction potential. According to German regulations the pH value should be controlled to be in the range of 6.5 and 7.6.

According to another aspect of the invention the method generates an alarm signal if a predetermined threshold value is surpassed. Additionally, a manual override can be provided to allow the operator of the system to override the control in case of an alarm. In this way maximum flexibility to the operation of the system is provided and this override may be used in order to quickly increase/decrease the recirculation rate.

In another aspect according to the present invention the disinfectant is chlorine, and the step of regulating comprises controlling the recirculation rate and/or the introduction rate of chlorine to achieve a quality factor being smaller than 3.3 corresponding to a predetermined maximum free chlorine concentration of 0.6 mg/L and a desired oxidation reduction potential of 750 mV.

Another aspect of the present invention is directed to a method wherein the recirculation pump is controlled to decrease the recirculation rate if the determined quality factor is smaller than 2.2 corresponding to a predetermined minimum free chlorine concentration of 0.3 mg/L and a desired oxidation reduction potential of 750 mV.

The invention is not limited to the ORP values/free chlorine minimum and maximum concentrations suggested by the DIN standard as it relates to a determined quality factor but can be adapted for other ORP values/free chlorine minimum and maximum concentrations set forth by other governing bodies that dictate pool water quality around the globe.

In accordance with one or more embodiments, the invention relates to a method of retrofitting or modifying an existing recirculation system with a system configured to perform the method steps comprising controlling disinfection in a recirculating water system, providing a controller comprising a processor for receiving a plurality of measurement signals from at least one water property sensor, determining based on the measurement signals from at least one oxidation-reduction-potential sensor and at least one free chlorine sensor at least one characteristic value, said characteristic value based at least in part on a chlorine redox relationship, comparing said at least one characteristic value with at least one predetermined value of a minimum standard and sending control signals from the controller to an existing flow control device to regulate the recirculation rate of the water based on the comparison value.

In accordance with one or more embodiments, the invention relates to a computer readable medium encoded with instructions for directing a controller to perform the method for controlling disinfection in a recirculating water system comprising the method steps:
providing a controller comprising a processor for receiving a plurality of measurement signals of at least one water property sensor for indicating a quality of the water, determining at least one characteristic value based on the measurement signals from at least one oxidation-reduction potential sensor and at least one free chlorine sensor, said characteristic value based at least in part on a chlorine redox relationship, and comparing said at least one characteristic value with at least one predetermined threshold value and regulating based on the comparison value the recirculation rate by means of a flow control device and/or a disinfectant level by means of a disinfecting system.

In yet another aspect of the invention a system for controlling disinfection in a recirculating water system is provided, the system comprising at least two water property sensors comprising an oxidation-reduction potential sensor and a free chlorine sensor, a processor configured to determine based on the measurements of the property sensors at least one characteristic value and to compare said at least one characteristic value with one or more predetermined threshold values and a controller configured to regulate based on the comparison value a recirculation rate by means of a flow control device and/or a disinfectant level by means of a disinfecting system.

A further aspect of the present invention is directed to a system, wherein the determined characteristic value comprises a quality factor based at least in part on a chlorine redox relationship.

In another aspect of the present invention said quality factor Q is calculated by taking a square root of the ratio of measured free chlorine and an oxidation-reduction potential dependent chlorine reference value. This algorithm is represented by the following equation:

$$Q = \sqrt{\frac{Cl_{2\ measured}}{Cl_{2\ reference}}}$$

wherein Q is the quality factor;
$Cl_2$ measured the measured chlorine value in ppm; and
$Cl_2$ reference the chlorine reference values in ppm, which depends on the measured oxidation-reduction potential (ORP) in mV.

In yet another aspect of the system according to the present invention the chlorine reference values and the at least one predetermined threshold are storable in a lookup table in a memory.

Another aspect of the present invention is directed to a system, wherein the predetermined values comprise a characteristic chlorine redox curve for the measured water by using the quality factor and a mathematical formula and wherein the processor is configured to compare the characteristic chlorine redox curve for the measured water with a predetermined chlorine redox curve of minimum water quality.

Another aspect of the present invention is directed to a system, wherein the flow control device comprises a recirculation pump connected to the controller to receive control signals to regulate the water recirculation rate based on at least one characteristic value selected from a group comprising the characteristic chlorine redox curve, the quality factor and/or lookup tables.

In yet another aspect of the invention the system is an improvement of the flow control device of the recirculation system, wherein the flow control device comprises a recirculation pump using a variable frequency drive to automatically adjust the flow rate.

The use of a variable frequency drive can linearly control the motor speed and torque of a pump by varying motor input frequency and voltage. This has proven to be a very efficient way of continuously adjusting the recirculation pump performance when being exposed to variable flow requirements due to the present control method.

In yet another aspect of the invention the system is provided with a pH sensor, wherein the control signal of the controller is further based on a pH value of the water.

By using the pH sensor and related control of the pH minimum standards can be maintained. For example, the minimum pH according to the German DIN 19643 of pH 6.5 can be regulated. Further, depending on the kind of flocculants used, a maximum pH of 7.2 or 7.8 can be regulated.

Another aspect of the present invention is directed to a system for controlling disinfection in a recirculating water system, wherein the controller is configured to send control signals to a disinfecting system and/or to the flow control device to achieve a disinfectant concentration being greater than a predetermined lower threshold value and lower than a predetermined upper threshold value.

In this way any local requirements of disinfectant level can be met. For example the chlorine range between 0.3 and 0.6 mg/L according to the DIN19643 can be controlled.

Another aspect of the present invention is directed to a system for controlling disinfection in a recirculating water system, wherein the disinfecting system is selected from the group comprising a dosing system of chlorine or a precursor thereof, a chlorine gas source, an electrolytic chlorine generator, a powdered activated carbon dosing system for adsorption of combined chlorine, an actinic radiation source and an ozonator or other oxidation source or a combination thereof.

In accordance with further embodiments, the invention relates to systems and techniques for controlling disinfection in a water recirculating water system, wherein the disinfecting system is a chlorine dosing system being configured to regulate the introduction rate of chlorine to achieve a quality factor being smaller than 3.3 corresponding to a predetermined maximum free chlorine concentration of 0.6 mg/L and an desired oxidation reduction potential of 750 mV.

In accordance with a preferred embodiment of the invention the system for controlling disinfection comprises a recirculation pump being configured to decrease the recirculation rate if the quality factor is smaller than 2.2 corresponding to a predetermined minimum free chlorine concentration of 0.3 mg/L and an desired oxidation reduction potential of 750 mV.

In accordance with further embodiments of the invention the system further comprises at least one property sensor selected from the group comprising a sensor for total chlorine or combined chlorine, conductivity sensor, a total dissolved solids sensor, turbidity sensor, a temperature sensor, a pressure sensor and a saturation index sensor.

The invention can further relate to a system, wherein the control system for a water recirculating system further comprises: a swimming pool or spa pool, wherein the recirculation rate is regulated by a recirculation pump, which is configured to withdraw water from said swimming pool and after passing at least one disinfecting module return water to the pool via a recirculation line, a water property measurement module comprising said oxidation-reduction potential sensor and free chlorine sensor, a display being configured to show at least one of the sensor signals and a plot of the characteristic curve based at least in part on the water property measurements.

In accordance with one or more embodiments, the invention relates to a system for controlling disinfection in a water recirculation system, wherein the system further comprises: at least one treatment module comprising a flocculant dosing system and downstream thereof a filtration unit, a heating system, a module or control unit for reduction of combined chlorine and a module or control unit for pH correction.

In accordance with the present system the recirculation rate and/or disinfectant level can be regulated in dependence of the measured water quality and corresponding determined characteristic value, which is dependent on the load. In this way overdosing of chlorine can be prevented and chemical consumption minimized. By including a continuous regulation of the recirculation pump, preferably by use of a variable frequency drive on the recirculation pump, further energy usage can be minimized. Other advantages of the present disclosure will be readily apparent to one skilled in the art from the following description and claims.

BRIEF DESCRIPTION OF THE INVENTION

The accompanying figures illustrate exemplary embodiments of the invention and explain, by way of example, the principles of the invention and are not intended to be drawn to scale. The figures are included to provide illustration and a further understanding of the various aspects and embodiments, but are not intended to restrict the disclosure to the embodiment illustrated in the figures. Where technical features in the figures or detailed description are followed by references signs, the reference signs have been included for the sole purpose of increasing the intelligibility of the figures and description. For purposes of clarity, not every component may be labelled in every figure.

In this description, reference is made to the accompanying drawings in which:

FIG. 5 illustrates a flow chart of the method for controlling a disinfection in a recirculating water system in accordance with one or more embodiments of the invention.

DEFINITIONS

Figure 1:
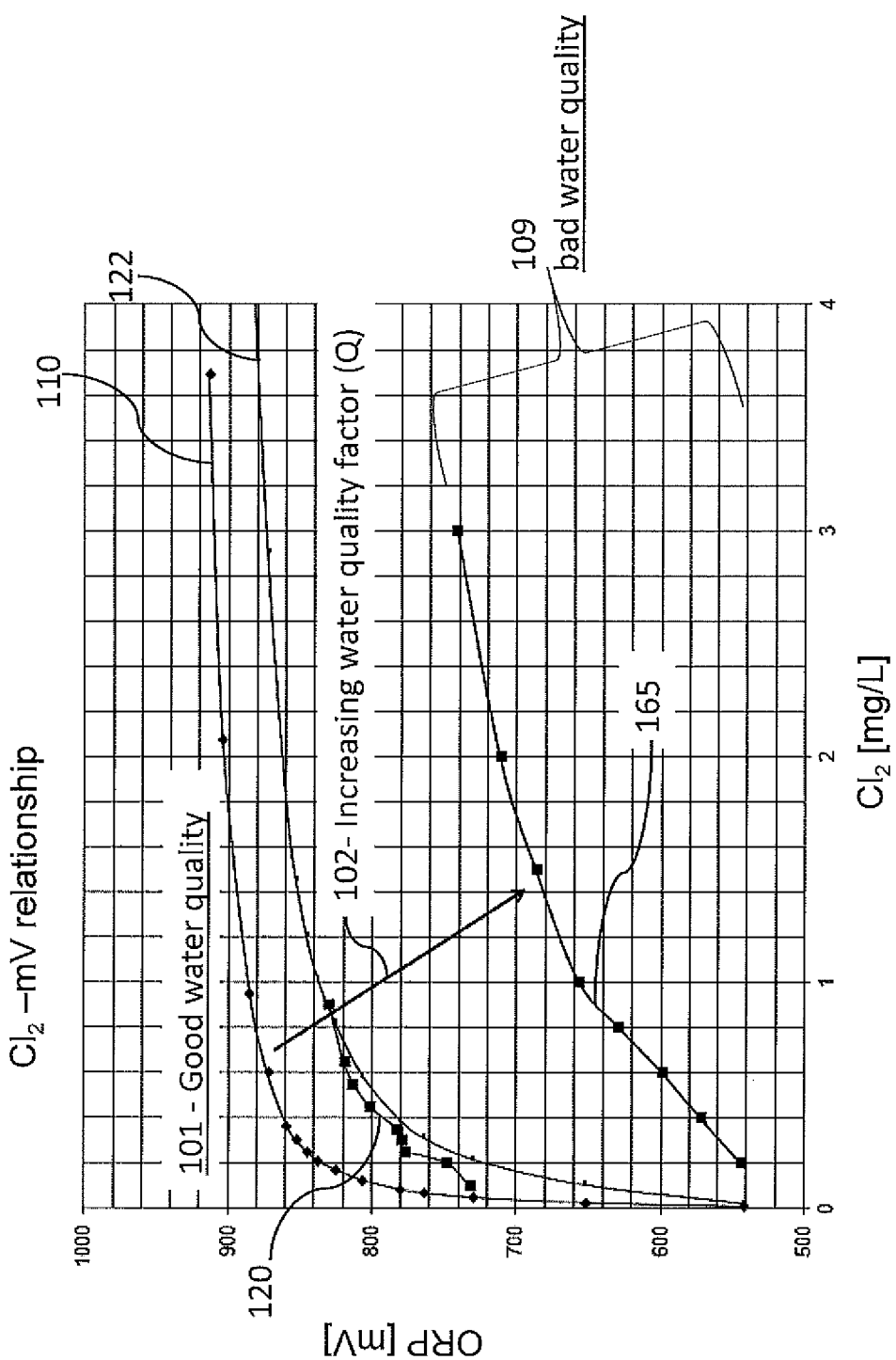
FIG. 1 is a graph illustrating characteristic relationships between oxidation-reduction potential and free chlorine in water.

As used herein, a plurality means two or more. The terms "comprising", "having", and "including", whether in the written description or the claims and the like, are open-ended terms, that is to say "including but not limited to".

The term "water property" refers to measurable or calculable quantities or values and might be collectively measured or at local or distinct sites or positions. Non-limiting examples of water properties that may be utilized to determine one or more characteristic values in accordance with one or more systems and/or methods of the invention include, but are not limited to, free chlorine being a so called active species or free available chlorine (FAC) in the water and oxidation-reduction potential (ORP) of the water. The concentration of any one or more species in the water may be derived from a concentration of one or more representative or proxy species that can provide or act as a surrogate indicator of one or more target species in the water.

The "characteristic value" comprises at least one of a "quality factor" and a "chlorine redox relationship", which is also represented as "$Cl_2$-mV relationship" and comprises said quality factor. Said "chlorine-redox relationship" pertains to a characteristic relationship between the oxidation-reduction potential (ORP) and the concentration of free chlorine species in the water. A water body to be recirculated in a recirculation system and/or undergoing disinfection can have a set of oxidation-reduction potential values with corresponding free chlorine concentration values. This set of values defines a characteristic chlorine-redox relationship such that a particular free chlorine concentration will have a particular ORP. The chlorine-redox relationship of the water can vary and be influenced by several factors including, but not limited to, the pH of the water, the temperature of the water, the type and/or concentration of oxidizer, and the type and/or concentration of oxidizable material in the water.

A "predetermined threshold" refers to one or more user selected requirements or official restrictions according to DIN standards or any other local governmental regulations that must be satisfied. According to the present invention the "characteristic value" is compared with a "predetermined threshold value", which can comprise a predetermined minimum and/or maximum threshold value. The comparison results in at least one "comparison value". If the comparison shows no difference between the "predetermined threshold value" and the "characteristic value", no further regulation is required. If there is a difference between the "characteristic value" and the "predetermined threshold value", the comparison value is either negative or positive. For example, if a minimum standard is not met, then the system or method will based on the comparison value control the flow device and/or disinfecting system to meet or exceed the "predetermined threshold value".

A "disinfectant" and corresponding "disinfecting system" serves to decontaminate, sanitize, render inactive or inert, or at least reduce the activity, typically biological activity, of one or more target species in a water body of a pool to be treated. Disinfectant or disinfecting species include, but are not limited to, oxidizing species or compounds as well as precursors thereof, such as, for example, halogen as halogens of chlorine or bromine and peroxygen compounds as well as ozone. Target species can include, for example, microorganisms as well as organic compounds. Thus, a disinfectant can destroy microorganisms and/or oxidize organic species as long as disinfectant remains available in the body of pool water.

Free chlorine or free available chlorine (FAC) is a measure of the concentration of hypochlorous acid plus the concentration of the hypochlorite ion expressed in milligrams per Liter (mg/L) or ppm. Hypochlorous acid (HOCl) is the active disinfecting component of free chlorine and available for disinfection. It is commonly known that when the pH increases, the percentage concentration of hypochlorous acid in free chlorine decreases because the hypochlorous acid converts to hypochlorite ion, which is a weak disinfectant. Accordingly, the pH is usually controlled in swimming pools or the like not to rise above 7.8 because of significant loss of disinfection power. Accordingly, pH is continuously measured and should be maintained between pH 6.5 and maximum 7.2 or 7.6, respectively.

The oxidation-reduction potential (ORP) is the potential of a disinfectant to oxidize organic materials including the inactivation of microorganism in a swimming pool or hot tub or other recirculation systems. Thus, it can be used as a direct measure of disinfection power. The higher the mV reading, the greater the potential of the pool water to oxidize and disinfect. As chlorine is added to the body of water, the disinfection action is derived mainly from hypochlorous acid (HOCl). Oxidizers like hypochlorous acid being one of the dissociated components of free chlorine in water will cause the mV value to increase and therefore increase disinfection.

DETAILED DESCRIPTION

FIG. 1 depicts a graph where oxidation-reduction potential in millivolts is plotted as a function of free chlorine concentration Cl$_2$ in mg/L. In this graph, chlorine-redox relationships or "Cl$_2$-mV relationships" of waters of distinct water qualities are shown.

More particularly, FIG. 1 illustrates where a "good quality water" (reference sign 101) would fall on this graph, namely in an area with high ORP values. The uppermost curve 110 represents a default characteristic chlorine redox curve or reference curve of "good water quality", wherein the reference values of free chlorine in mg/L are plotted versus the corresponding oxidation-reduction potential values (ORP in mV). Said curve 110 corresponds to a water of good quality, namely a water of drinking quality, wherein the disinfectant chlorine was stepwise added to achieve the corresponding free chlorine values. The results of this reference or default curve have been used in the present invention for a characteristic chlorine-redox curve having the water quality factor 1. From this curve it can, for example, be derived that e.g. for Cl$_2$ values between 0.2 mg/L and 1 mg/L the ORP of a water of "good quality" has more than 840 mV.

The values of the shown characteristic reference chlorine-redox curve along with the quality factor are represented in the following table 1:

TABLE 1

| | Reference | |
|---|---|---|
| CL$_2$ reference in ppm | ORP in mV | Quality Factor |
| 0.005 | 542 | 1 |
| 0.022 | 653 | 1 |
| 0.045 | 730 | 1 |
| 0.065 | 765 | 1 |
| 0.08 | 780 | 1 |
| 0.12 | 806 | 1 |
| 0.17 | 826 | 1 |
| 0.21 | 838 | 1 |
| 0.25 | 846 | 1 |
| 0.3 | 853 | 1 |
| 0.36 | 859 | 1 |
| 0.6 | 873 | 1 |
| 0.95 | 885 | 1 |
| 2.07 | 904 | 1 |
| 3.69 | 914 | 1 |

Further, in contrast to the "good water quality curve" 110, an example of a chlorine-redox relationship with the reference numeral 165 having relatively bad water quality is shown. The values of said curve 165 have been achieved in the laboratory, wherein relatively highly loaded water with high organic demand has been sampled. As can be taken from FIG. 1, the water with bad water quality has a significantly flatter curve and significantly lower ORP values, wherein all ORP values are below 750 mV as indicated by the reference numeral 109 and the indication "bad water quality". It is noted that the curve 165 would correspond in the area between low free Cl$_2$ values, which are close to zero, and the value in the height of 1 Cl$_2$ mg/L approximately to a characteristic chlorine-redox curve having a quality factor of about 6.5.

Both curves 110 and 165 have a logarithmic relationship, however the slope flattens if the water quality decreases. Characteristic chlorine-redox curves of waters between these curves of good water quality (reference curve 110) and of bad water quality (curve 165) have quality factors being less than 6.5 and more than 1.

Further FIG. 1 shows a calculated characteristic chlorine-redox curve 122 in between these curves 110 and 165. The quality factor of 2.2 of said curve 122 was chosen because it corresponds to a predetermined minimum free chlorine concentration of 0.3 mg/L and a desired oxidation-reduction potential of 750 mV. This minimum oxidation-reduction potential ORP value of 750 mV corresponds to German regulations. Further, the minimum value of free chlorine according to DIN 19463 should be 0.3 Cl$_2$ mg/L. Based on these predetermined threshold values, the characteristic chlorine redox curve 122 with a factor of 2.2 was identified and said factor can be used as predetermined characteristic value.

Summing up, the characteristic curves and free chlorine-redox (Cl$_2$-mV) relationships of the curves 110, 122 and 165 show that with an increasing water quality factor Q, the water quality decreases (see arrow 102 in FIG. 1). That is to say the reference curve 110 has the default factor Q=1, whereas the exemplary predetermined characteristic chlorine redox curve 120 a factor Q=2.2, which is about twice as high.

The controller according to the present invention, can be configured based on comparison with the oxidation-reduction potential dependent quality factor (here, for example, Q=2.2 of curve 122) to automatically decrease the recirculation rate and/or lower the disinfectant dosing rate of chlorine according to demand. This method has the advantage that in contrast to a simple on/off chlorine dosage by using an ORP dependent quality factor, the disinfecting and oxidizing chemical reactions that are about to occur can be anticipated.

Furthermore, the graph shows a chlorine redox relationship 120 of measured data of pool water in order to show that the control method can be applied for water bodies of swimming pools. Accordingly the chlorine redox relationship 120 represents sample measurements and therefore the chlorine redox pairs vary much more than for example the calculated characteristic chlorine redox curve 122, which is based on the quality factor 2.2 and a mathematical formula. It can be taken from the graph and the below table 2, that the value pairs of the relationship 120 with high chlorine values of 0.9 mg/L free chlorine correspond to the highest ORP value of 830 mV. Further values of said exemplary pool water measurements are listed in the following table:

TABLE 2

| Sample measurements in pool water | | |
|---|---|---|
| free chlorine Cl$_2$ in ppm | ORP in mV | Quality factor for values above 750 mV |
| 0.1 | 733 | |
| 0.2 | 749 | |
| 0.25 | 777 | 1.8 |
| 0.3 | 779 | 1.9 |
| 0.35 | 783 | 2.1 |
| 0.45 | 802 | 2.0 |
| 0.55 | 813 | 2.0 |
| 0.65 | 820 | 2.0 |
| 0.9 | 830 | 2.2 |

The sample curve 120 shows that the oxidation reduction potential dependent quality factor in the height of 2.2 can be used as a control parameter for the measured sample water. As can be taken from the table 2 and more particularly the column "quality factor", the calculated quality factor Q based on the measured ORP values and the above given equation is equal (at the highest ORP value of 830 mV) or smaller than the quality factor 2.2. Thus the predetermined threshold value for the quality factor of 2.2 is not trespassed by the sampled water body.

Moreover it is noted that all value pairs have higher or about equal ORP values than the predetermined characteristic minimum chlorine-redox curve 122. Thus, besides a quality factor comparison alternatively or in addition, the characteristic chlorine-redox curve of the sample water can be compared with the predetermined minimum chlorine redox curve 122. In the measured swimming pool according to the relationship 120, the oxidation-reduction potentials of greater than 720 mV allow for a sufficient disinfection. These values above 720 mV may be a good operation condition for the system if the respective national requirements allow this minimum ORP value.

In this context it is noted that the World Health Organisation has published international guidelines for the safety of swimming pools and similar recreational-water environments, including standards for minimizing microbial and chemical hazards (Guidelines for safe recreational water environments; Volume 2: Swimming pool and similar environments, 2006): For swimming pools and similar environments, levels in excess of 720 mV (measured using a silver/silver chloride electrode) suggest that the water is in good microbial condition. Nevertheless, it is suggested that appropriate ORP threshold values should be determined on a case-by-case basis and disinfection efficacy should be monitored accordingly.

Although above minimum ORP might be sufficient to meet local pool standards in some countries, there might be stricter rules in other countries. For example, the minimum ORP standard for Germany is 750 mV. Accordingly, if the control system and method is applied in Germany, this minimum ORP value needs to be maintained besides the selected minimum quality factor of 2.2. To fulfil German requirements, the controller can be further configured to use the ORP threshold value as the regulating parameter and thus to control that the minimum ORP standard value of 750 mV is always fulfilled. For the sample curve 120 it is noted that values above 750 mV would also suffice the minimum standard of free chlorine being 0.3 mg/L according to the German DIN 19643.

If the controller uses as further control parameter the oxidation-reduction potential threshold besides the quality factor, which is at least in part based on a chlorine redox relationship, the control method is more accurate than a method comprising only controlling the chlorine, as is commonly used in conventional chlorine control systems.

In general terms, if a body of water is measured as shown by the sample curve 120, and the measurement signals are such that all value pairs are above the minimum quality chlorine redox curve, which has been set for comparison (here with the factor Q=2.2), then the given minimum standard curve is fulfilled and the water quality is good. Depending on the difference to the minimum predetermined values of the quality curve 122, i.e. depending on the comparison value, the controller sends control signals to the recirculation pump in order to decrease the recirculation rate accordingly. In this way, energy savings are achieved.

Figure 2:
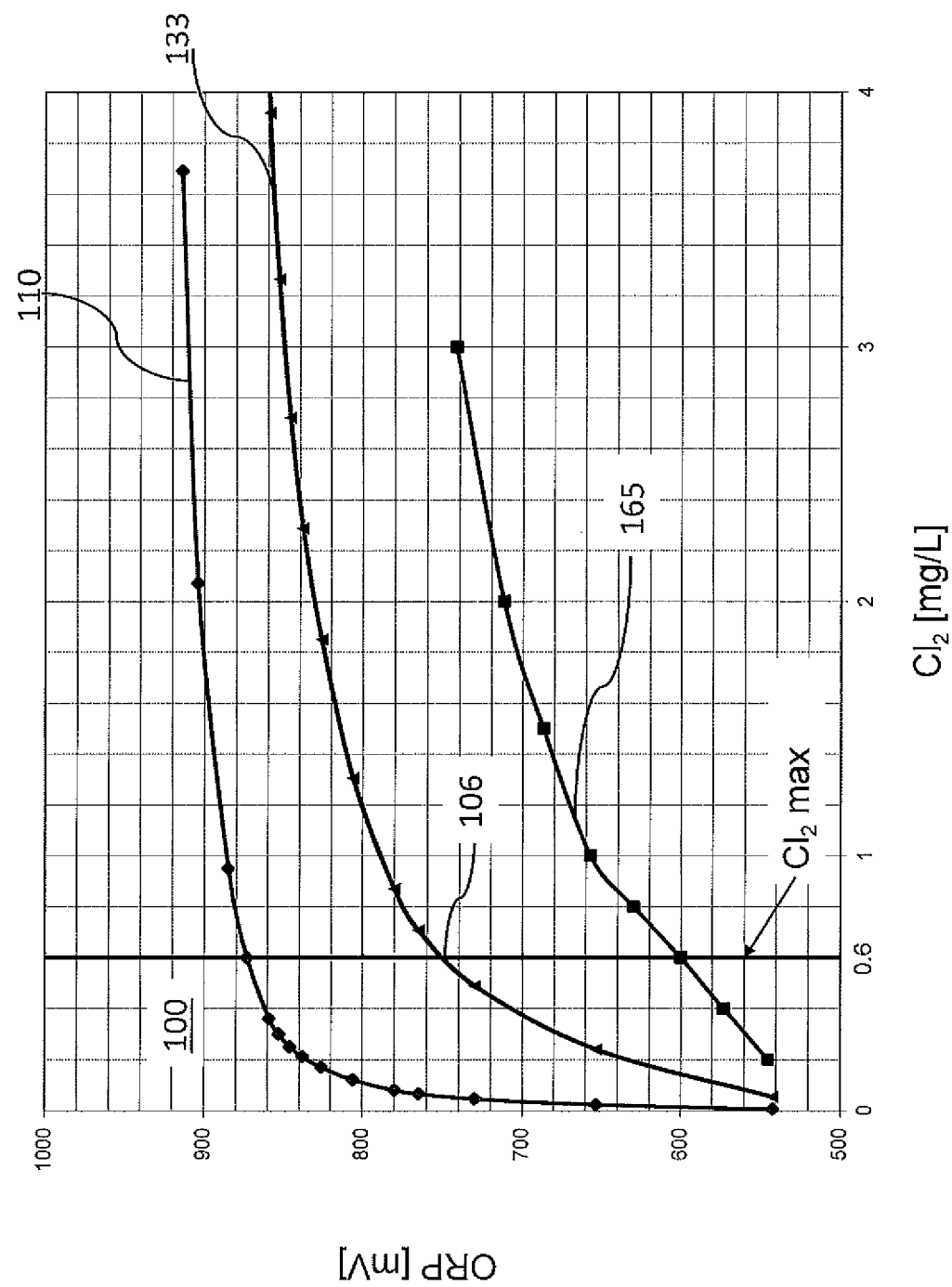
FIG. 2 is another graph illustrating characteristic relationships between oxidation-reduction potential and free chlorine wherein another predetermined threshold value of a quality factor is shown.

FIG. 2 shows another graph of a chlorine redox relationship with another selected characteristic chlorine redox curve including a higher quality factor. The following describes how this characteristic curve has been selected. Accordingly, in this graph a predetermined maximum chlorine level is plotted. For Germany, for example, the maximum allowed value according to the DIN 19643 is a free chlorine concentration of 0.6 mg/L (see vertical line at 0.6 $Cl_2$ labelled with "$Cl_2$ max" in FIG. 2). Thus, the controller needs to be set that this value is not trespassed. Taking this maximum chlorine value as operation condition together with a minimum oxidation-reduction potential of 750 mV, one arrives at a free chlorine/ORP pair at point 106. The corresponding characteristic chlorine redox curve is plotted in curve 133. This curve 133 has the quality factor Q=3.3 and is less asymptotic than the default quality characteristic redox chlorine curve 110, wherein Q=1, and is also flatter than the previous selected predetermined characteristic curve 122 with Q=2.2 (shown in FIG. 1).

According to a preferred embodiment of the invention, the control system can be set that regulating comprises to decrease the recirculation rate if based on the measured ORP and free chlorine values the determined quality factor is smaller than 3.3 (Q<3.3) corresponding to a predetermined maximum free chlorine concentration of 0.6 mg/L and the desired oxidation-reduction potential of minimum 750 mV. In addition to said regulation, the disinfecting system can be controlled to achieve a disinfection concentration only lower than the predetermined upper threshold value of 0.6 mg/L.

If the maximum chlorine concentration is surpassed, the controller can send control signals to the recirculation pump and increase the recirculation rate in a stepless fashion until the target chlorine concentration is met. Alternatively or in addition, the chlorine introduction rate can be decreased by controlling the corresponding disinfecting system.

Figure 3:
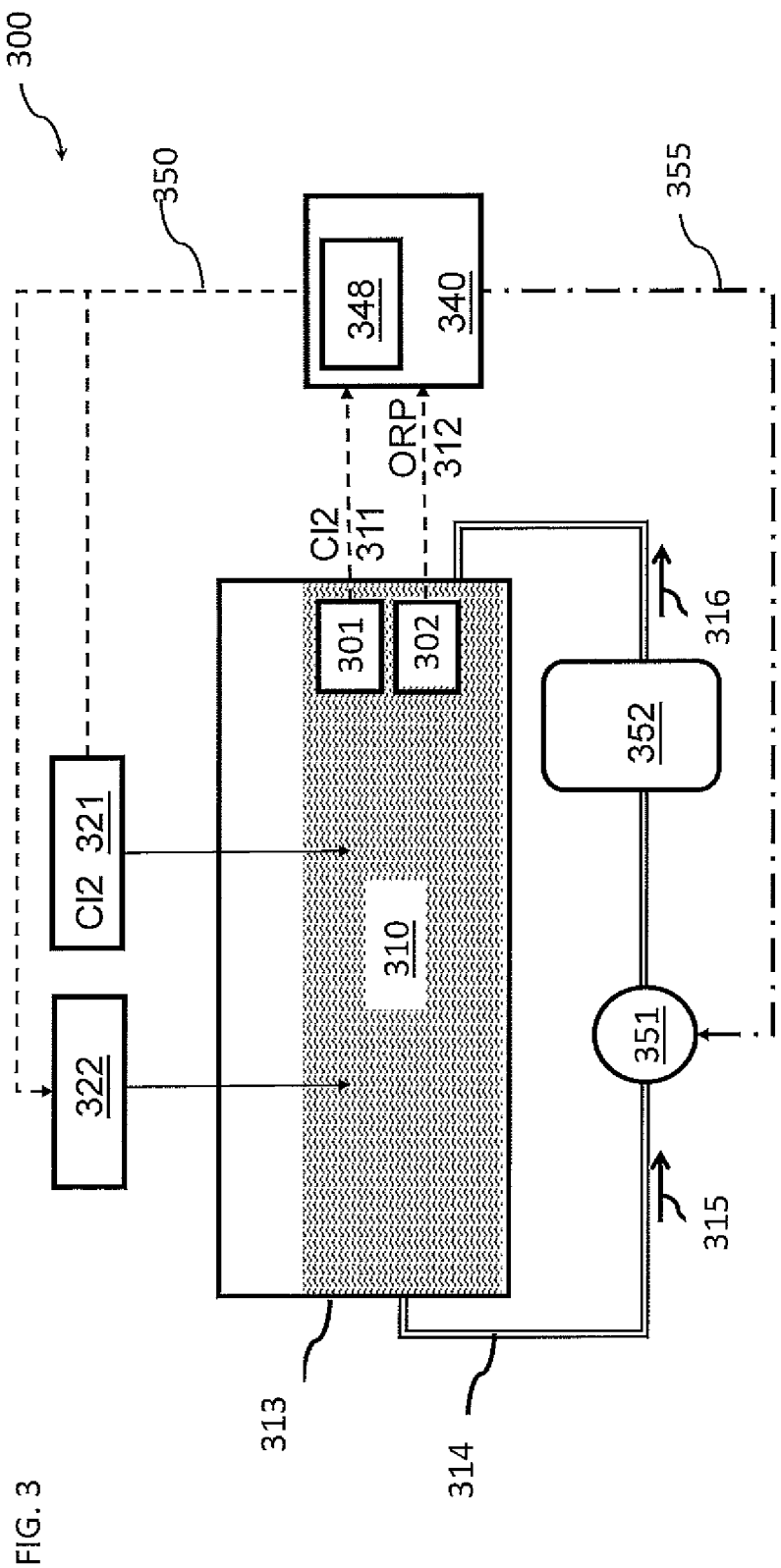
FIG. 3 illustrates a system in accordance with one or more embodiments of the invention.

FIG. 3 shows a water recirculation system 300 according to one or more embodiments of the present invention. More particularly, FIG. 3 shows a system for controlling disinfection by regulating a recirculation rate and/or a disinfectant level of a recirculation water system. The system comprises at least two water property sensors 301, 302. The sensors 301 and 302 can be a multisensor or a plurality of sensors located at distinct places in the water body 310 of the swimming pool 313.

FIG. 3 shows the at least one free chlorine sensor 301, which is configured to measure chlorine as free available chlorine comprising hypochlorous acid (HOCl) and the hypochlorite ion ($OCL^-$). The free chlorine can be measured, for example, by a potentiostatic-free electrode sensor or any other common free chlorine sensor. The use of a free electrode measuring has the advantage that it eliminates the need for constant zero adjustment.

Further, there is an oxidation-reduction potential (ORP) sensor 302 provided in order to measure the oxidation-reduction potential in mV. The measurement signal 312 of the oxidation-reduction potential sensor will vary according to the water source used and the current load of the swimming pool 313. The ORP can also vary according to the materials used to construct the swimming pool 313. According to the different operation conditions and the distinct conditions of operation as outdoor pools or indoor pools, the ORP and free chlorine values need to be measured continuously by the measurement module of the control system.

At least two sensors 301 and 302 measure the respective water properties and each sensor transmits a measurement signal (311 for chlorine and 312 for the oxidation-reduction potential) to the controller 340. After the measurement signals 311, 312 have been received by a controller 340, the processor of the controller 340 is configured to determine at least one characteristic value based on the measurement signals 311, 312. Said controller 340 further comprises a display 348, which can show the measured values and optionally the chlorine-redox relationship.

Based on a selected predetermined minimum chlorine-redox curve and/or predetermined threshold values for free chlorine value, the introduction or feed rate of chlorine can be regulated by an output control signal 350. This output signal is transmitted to a chlorine disinfecting system 321.

The disinfecting system 321 can be operated independently of another secondary disinfecting system 322. As an example for a secondary disinfecting system 322, an actinic radiation source as a UV system, an ozonator or a powdered activated carbon dosing system can be used.

Various types of chlorine systems can be used for introducing chlorine into the water body 310. The disinfecting system 321 can comprise a common dosing system of chlorine or a precursor thereof. Alternatively, other chlorine disinfecting systems can be selected from a chlorine gas source or an onsite electro-chlorination system (OSEC). The so-called OSEC system can dose chlorine in the form of sodium hypochlorite. The hypochlorite is produced by using an electrolytic cell and sodium chlorite, wherein the reaction is as follows:

Reaction at anode: $2Cl^- \rightarrow Cl_2 + 2e^-$

Reaction at cathode: $2Na^+ + 2H_2O + 2e^- \rightarrow 2NaOH + H_2$

In solution: $Cl_2 + 2OH^- \rightarrow ClO^- + Cl^- + H_2O$

Overall reaction: $NaCl + H_2O \rightarrow NaOCl + H_2$

Accordingly, electrochlorination can be used as free chlorine source based on the generation of sodium hypochlorite from sodium chloride and water.

According to the control method of the present invention, the measurement signals 311, 312 are used to determine at least one characteristic value by the processor. This characteristic value provides an indication of a quality of water. Further, the processor is configured to compare said at least one characteristic value comprising a quality value with at least one predetermined threshold value. The comparison value can trigger that the controller regulates the recirculation rate of the recirculation system.

The recirculation system comprises a recirculation line 314 and a recirculation pump 351. The arrow 315 indicates the flow from the pool 313 to the recirculation pump 351. Further, downstream of the pump 351, a filtration unit 352 is arranged. The output of the filtration unit 352 is fluidly connected to the swimming pool 313, wherein the arrow 316 indicates the filtered water, which is pumped back to the pool via the recirculation line 314.

The recirculation pump 351 has a specific flow rate, which can be controlled by the controller 340. According to a preferred embodiment of the invention, one means to increase or decrease the water circulation rate is to use a variable frequency drive (VFD) on pump 351 and connect the controller with said VFD. The use of a variable frequency drive pump motor results in energy savings since the pump will operate at the most efficient speed based on the frequency drive input 355. This eliminates advantageously the use of oversized pumps that have been used in former simple on/off modes and allow the recirculation rate of the water to be controlled in a linear manner.

Such use of frequency converters ensures optimal adaptation to changing conditions and thus the controller 340 enables the control system 300 to detect and learn continuously the water quality and if needed, to immediately adapt the recirculation rate of the pump 351. In other words, the recirculation pump 351 is connected to the controller 340 and regulated by control signal 355 in response to the water quality measured. If the water quality, which is represented by at least one controller determined characteristic value, is compared to a predetermined threshold value (see e.g. curves 122 or 133 in FIG. 1 or 2), results in a water quality better than the predetermined minimum quality factor or quality curve, then the recirculation rate is linearly adjusted to decrease.

On the other hand, if the measurement signals of the chlorine oxidation-redox potential and free chlorine show that the water quality is less than the predetermined threshold value, then the controller can either regulate a higher introduction or feed rate of disinfectant in the first disinfecting system 321 and/or regulate the secondary disinfecting system 322 by means of regulating the delivered dose of energy or the dose of a disinfectant or of powdered activated carbon (PAC) or other device. The PAC or a radiation as UV can be used to reduce combined chlorine or chloramines, which ca be measured by an additional sensor (not shown in FIG. 3). Advantageously, the disinfecting system 321 and the introduction rate of chlorine can be controlled in a linear manner as opposed to former systems which simply turn the chlorine metering device on or off in response to a target chlorine concentration.

By using these features, it is possible to provide acceptable water quality for aquatic applications such as swimming pools, spa pools, recreational or therapeutic aquatic environments or similar environments while minimizing chemical consumption and energy usage.

Figure 4:
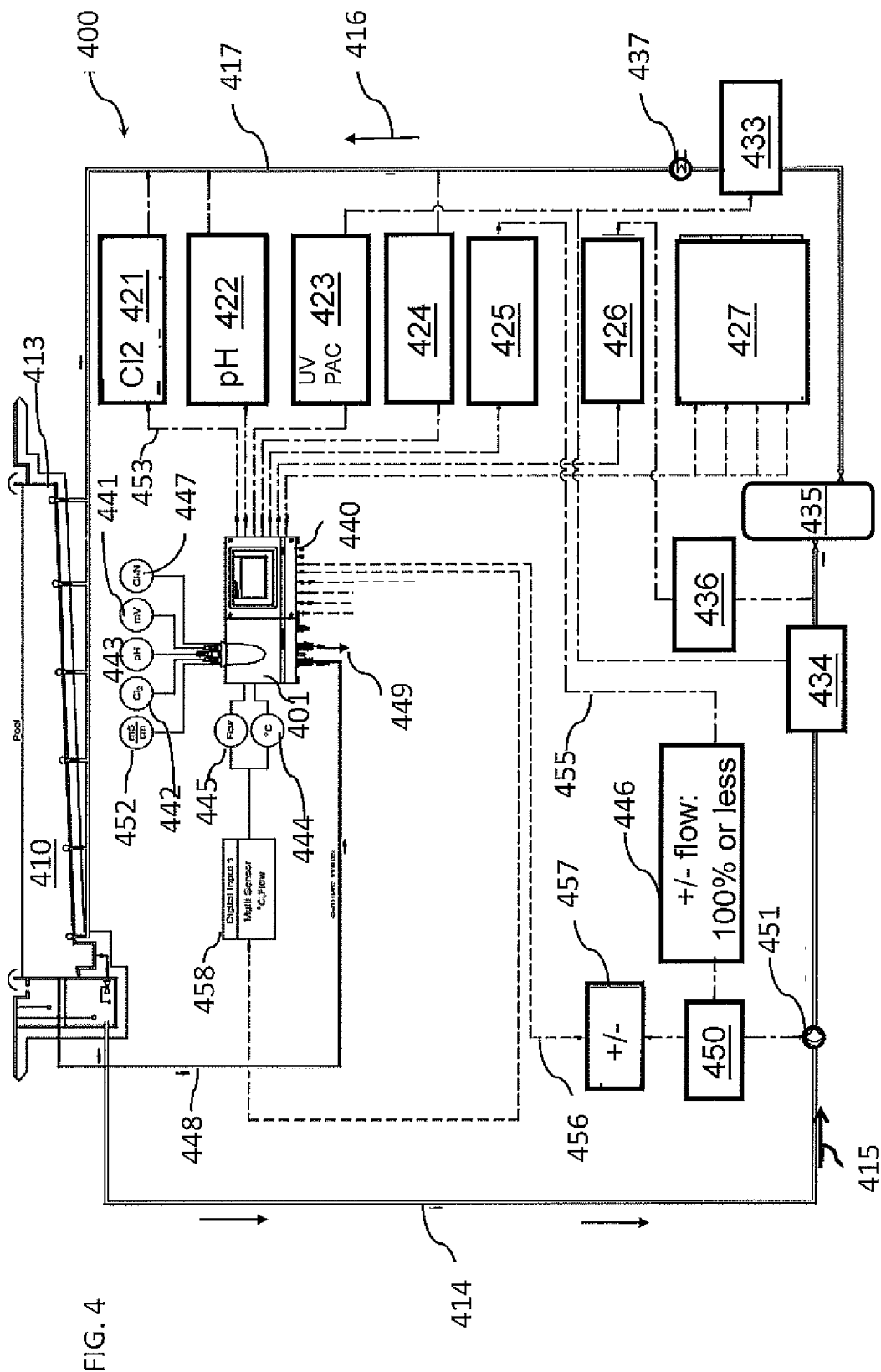
FIG. 4 illustrates schematically another control system in accordance with one or more embodiments of the invention.

FIG. 4 shows a schematic flow diagram of a system 400 for controlling disinfection in a recirculating water system according to one or more embodiments of the present invention. In the upper part of the diagram, a cross section of a pool 413 is schematically shown. Said pool 413 can be a swimming pool or spa pool or any other similar environment for recreation or hydrotherapy. Said pool 413 is filled with a water body 410. Depending on the application, said pool 413 can be supplied with fresh, marine, mineral or thermal water.

If the pool is, for example, for therapeutic purposes or other reasons configured for saline bathing, then the measurement module 401 comprises a conductivity sensor 452. Said conductivity measurements are then transferred or transmitted to the controller 440 and passed on to a conductivity control 424 which, if needed, can regulate the salinity of the water 410 in the pool 413 to a predetermined value or range.

In general there are many pollutants as well as distinct weather conditions that can consume a disinfectant and quickly reduce e.g. the free-residual chlorine concentrations. Such pollutants and conditions in pools include the bather pollution as perspiration, urine, cosmetics, sunscreen and other substances that contain organic matter. For outdoor pools there is also the wind and wind-blown debris including high organic matter as well as the influence of sunlight. If the water contains nitrogen-based organic compounds in the presence of free available chlorine, the chloramines or combined chlorine concentration will increase.

To measure a plurality of water quality properties of the pool water 410, the water is drawn by a measurement line 448 through a measurement module 401 and then drained with drain 449. To ensure a stable and representative measurement signal, a constant flow rate is required for this multisensor 401. For this multisensor 401 it is required to continuously measure the flow of the measurement cell with sensor 445 and further the temperature with the sensor 444 for a potential temperature compensation. The measurement signals of said sensors 444 and 445 are then used as digital input 458 for the multisensor 401. Alternatively to the shown measurement concepts, also a closed measurement module not having an open drain 449 can be used as a measurement sensor.

The multisensor measurement module 401 is able to measure a plurality of water properties. According to the present invention, it is essential to measure free chlorine directly or indirectly with sensor 442 and the oxidation-reduction potential by sensor 441. Further, the pH can be measured using the pH sensor 443 and based on the measurement signals of sensor 443, the pH controller 422 can regulate the pH. This can be done, for example, by adding $CO_2$ gas. Carbon dioxide ($CO_2$) is a gas which, when added to water, forms a weak acid, namely carbonic acid and may be used to reduce the pH. Alternatively, an acid or a buffer may be added.

The multisensor 401 is further configured to measure with sensor 447 combined chlorine or chloramine (Cl—N). The chloramine sensor 447 can be used to control the combined chlorine and chloramine concentration by a chloramine control unit 423. By using, for example, a UV ultraviolet radiation-based disinfecting system 433 or a PAC dosing system 434, the accumulation of chloramines can be reduced. The use of one or both of these secondary disinfecting system for the reduction of total chlorine would in turn also reduce the chlorine feed requirements.

The PAC dosing system 434 is controlled by control unit 423 and the control signals are sent to the PAC dosing system 434. This PAC dosing system 434 is in the recirculation line 414 upstream of filtration system 435, which can filter any particulate matter introduced by the PAC dosing system 434. The filtration system 435, which may be based on sand filtration or other filtration technique, is downstream of flocculation dosing module 436. Said flocculation dosing module 436 is controlled by flocculant controller 426 and is commonly consisting of a flow proportional controller.

The filter 435 may be a conventional filter used in conjunction with swimming or spa pools. This filtering unit 435 is used for filtering the water to maintain its clarity and freshness. To further monitor the water quality, TDS and turbidimeter may be employed. For such optional measurements and control functions, an extension board 427 is provided.

The filtered water is optionally treated with a UV irradiation system 433, which is controlled by the controller 423. Downstream of this UV system 433 a heater 437 is provided, which is configured to maintain a selected temperature of the water body 410. Then water is supplied through a return line 417 back to the pool and entered through a plurality of inlets from the bottom of the pool 413 into the water body 410. The water flow back to the pool is indicated by the arrow 416. This return line 417 is fluidly connected to the above-mentioned control systems i.e. to a conductivity control 424, to the disinfecting system 421 for dosing chlorine and to the pH controller 422 for a potential pH correction. Alternatively, these control systems can also be arranged that their outlets are separate from the recirculation line and directly connected to the water body of the swimming pool as shown e.g. in FIG. 3.

It is noted that pool and hot tub water quality parameters including the disinfection concentration required varies in different regions of the globe according to the respective jurisdiction or guidelines. As mentioned above according to German regulations, the predetermined limits can be taken from the DIN 19643. According to said DIN, the lower predetermined threshold for free chlorine is 0.3 mg/L and the upper predetermined threshold is 0.6 mg/L. Further, the oxidation-reduction potential according to German regulations should be minimum 750 mV. The pH should be set to be in the range of 6.5 and 7.6. Further, the Cl—N value should be lower than 2.2 mg/L.

To ensure that such predetermined threshold values are met, the control unit 425 is provided. If e.g. the predetermined concentration range of free chlorine is fulfilled, this information can be transmitted to the pool control or control unit for recirculation 446 by sending control signals via control line 455.

If a reduction of the recirculation rate is possible based on the threshold values, the control unit 425 sends respective control signals to the control unit 446 for recirculation. Said control unit for recirculation 446 can generate control signals to regulate the flow to 100% or less. The corresponding control output signals from unit 446 to either increase or decrease the circulation rate are sent to control unit 450, which then can initiate a special mode comprising, for example, the reduction of the flow to 75% or 50%.

As soon as an increase or decrease is actually triggered or initiated by the pump control unit 450, there will be a digital input or feedback signal 457 back to controller 440. The feedback signal 457 is transferred via line 456 and comprises the flow change information (+/−), namely to either increase or decrease the recirculation flow. If the flow rate has been linearly decreased, the recirculation has been adjusted to a reduced setpoint and the system is operated in a so-called ECONOMIC mode. The recirculation pump 451 delivers the actual status i.e. the feedback signal 457 of the pump 451 to the controller 440.

According to a preferred embodiment of the present invention, increasing or decreasing the water recirculation rate is to use a variable frequency drive (VFD) for the pump control 450. This enables the controller to automatically adjust the water recirculation rate.

As outlined above, the adjustment is based on a determined characteristic value based at least partially on the chlorine redox relationships. Preferably, a predetermined quality factor can be used as a known minimum quality factor wherein the controller 440 continuously compares and verifies whether the predetermined threshold value is met or not met. In the case that the quality factor needs to be changed by regulating the flow control device, in this case the pump 451 and the corresponding pump control unit 450 comprising a variance frequency drive VFD, is regulated in order to adjust the system to the desired predetermined quality value.

The use of a variable frequency drive results in optimized energy use since the pump 451 will operate at the most efficient speed based on the variable frequency drive input given by the pump control unit 450. In this way, the use of oversized pumps, which have formerly been used, as well as simple on/off pump modes, can be eliminated. An advantage of the pump control unit 450 is that the recirculation rate of water can be controlled in a linear and continuous fashion. According to the invention, the variable frequency drive of the pump 451 is connected to the controller unit 446 and thus the recirculation can be adjusted in response the measured water quality, which has been received by controller 440 and further compared to a predetermined curve or predetermined threshold value of a characteristic chlorine-redox-curve.

Besides the control of the recirculation rate, the disinfecting system for chlorine dosing 421 can be controlled by control signals 453 from the controller 440. This can also be done continuously such that the chlorine can be controlled in a linear manner.

This is also an advantage in contrast to formerly used control systems of disinfecting systems which simply turn on or off the chlorine metering device in response to a charged chlorine concentration. By using this control system, it is possible to provide safe water quality for aquatic water applications as the swimming pool 413, while minimizing chemical consumption and energy usage.

Finally, the system may have other ancillary components and/or subsystems which are not shown in detail and may include pipes, pumps for dosing e.g. disinfectant, tanks, power supply and distribution subsystems that cooperatively allow operation of the system. Further a variety of treatment procedures may be employed. For example, an optional disinfecting treatment as an ozonator may be provided to remove at least a portion of an elevated organic load or bacteriological load. Treatment processes may be performed in the recirculating line and may include, for example, a further separation method directed to the reduction of particulates.

Other components not shown can be provided in relation with the system 400, for example, the controller 440 may include one or more processors typically connected to one or more memory devices. Memory devices which are not shown can comprise, for example, any one of a disc-drive memory, a flash memory drive, a RAM memory device or any other device for storing data. In this memory, either characteristic curves or lookup tables can be stored which are used as a basis for the control method and system 400. The memory can be further used to store historical measurements of the measurement unit 401 and other data relating to the characteristic values or process parameters of the water over a period of time.

One or more displays of the controller 440 can show the current measurements as free chlorine of the chlorine sensor 442 or the mV measurements of the ORP sensor 441. If a change of a predetermined threshold value is desired, input devices can be used in order to change set values. The controller 440 may be implemented using one or more computer systems or an application-specific integrated circuit (ASIC). Further, printing devices or a connection to a communication network may be provided.

FIG. 5 shows a flowchart of the method 500 for controlling disinfection in a recirculating water system according to the present invention. The first method step 510 comprises receiving measurement signals by the controller. This method step includes receiving at least one measurement of free chlorine and a measurement of the oxidation-reduction potential.

In step 520 the at least one characteristic value is determined based on the measurement signal. Said characteristic value is based at least in part on a chlorine redox relationship. The characteristic value may comprise a quality factor.

In step 530 the predetermined threshold value is compared to the determined characteristic value. In the flow chart, quality factor Q is indicated as an exemplary determined characteristic value. Said factor Q is compared in step 530 to a predetermined minimum standard quality factor $Q_{min}$. If Q is greater than $Q_{min}$ ($Q>Q_{min}$), then the water quality is not sufficient and the recirculation flow rate needs to be increased in step 540.

On the other hand, in accordance to method step 550, if the quality factor Q is lower than a predetermined quality factor $Q_{min}$ ($Q<Q_{min}$), then the water quality is better than required and the system may be regulated by the controller so that the recirculation rate decreases.

By decreasing or alternatively increasing the recirculation rate, the disinfectant level and oxidation-reduction potential is controlled. Accordingly, this regulation will result in a new quality factor or characteristic chlorine-redox curve. Based on a new curve, the controller will regulate until the target ORP and/or disinfectant level is achieved. The regulation of an optimized recirculation rate is performed continuously and linearly. This can be achieved by using as recirculation pump that includes a variable frequency drive.

By continuously considering the water quality factor Q, the controller is able to reduce or alternatively increase the recirculation rate of the swimming pool in a seamless or continuous fashion. Thus a stepless method for controlling is provided. This is a good technical solution to save energy without degrading the water quality. By means of a continuous "learning" control method for an optimized recirculating rate in combination with a disinfection control it is possible to save chemicals and energy.

Example to determine quality factor by means of a lookup table

Further, according to one or more embodiments of the present invention, the control method comprises the method step to determine the characteristic value being a quality factor. This is achieved by the controller by performing a plurality of method steps.

Firstly, the method comprises receiving the chlorine reference values together with the corresponding reference oxidation-reduction potential value and storing set value pairs in a lookup table. Using a lookup table has the advantage of saving processing time. If the required value is not in the lookup table and the measured oxidation-reduction potential value is between two of the values, the oxidation-reduction potential value can be interpolated between two neighbouring oxidation-reduction potential values. A similar interpolation algorithm can be used for the corresponding chlorine reference value.

The lookup table is listed below:

TABLE 3 lookup table for retrieving chlorine reference values

| ORP in mV | $CL_2$ reference in ppm |
|---|---|
| 542 | 0.005 |
| 653 | 0.022 |
| 730 | 0.045 |
| 765 | 0.065 |
| 780 | 0.08 |
| 806 | 0.12 |
| 826 | 0.17 |
| 838 | 0.21 |
| 846 | 0.25 |
| 853 | 0.3 |
| 859 | 0.36 |
| 873 | 0.6 |
| 885 | 0.95 |
| 904 | 2.07 |
| 914 | 3.69 |

Fixed characteristics are included in the above reference lookup table. Based on this table, the quality factor Q can be calculated with the following formula $$Q = \sqrt{\frac{Cl_{2\ measured}}{Cl_{2\ reference}}}$$

wherein Q is the quality factor;
$Cl_2$ measured the measured chlorine value in ppm; and
$Cl_2$ reference the chlorine reference values in ppm.

In the following example, the measured chlorine is 0.6 ppm or mg/L. Further, the measured oxidation-reduction potential or ORP value is 806 mV. Based on the measured oxidation reduction potential value of 806 mV, a corresponding free chlorine value from the reference table is derived.

This is, in this case, 0.12 ppm or mg/L. Based on the readings from the lookup table, the factor can be calculated as follows;

$$Q = \sqrt{\frac{0.60}{0.12}} = 2.24$$

In the case that the predetermined threshold value of the quality factor Q is 3.3, the water quality is sufficient for the example and the recirculation rate can be regulated to be decreased.

Another control process which can be performed, for example, by the control unit 425 (see FIG. 4), may monitor at the same time if the chlorine value is within predetermined threshold values. In the present example the measured chlorine value is 0.6 mg/L. Accordingly the value meets the maximum allowable free chlorine concentration according to DIN 19643 and there is no need to increase the chlorine dosing, but a reduction of the chlorine content is possible as long as the chlorine content will not be less than 0.3 mg/L. Accordingly, for the given example the control can be used to regulate the recirculation rate such that only the minimum of disinfectant level is achieved, while at the same time the desired water quality factor is met. In this manner it is possible to make adjustments to the water recirculation rate in order to save energy and chemicals.

Those skilled in the art would readily appreciate that the various configurations described herein are meant to be exemplary and that actual configurations will depend upon the specific application for which the water treatment system and methods of the present disclosure are used. Those skilled in the art will recognize or be able to ascertain using no more than routine experimentation, many equivalents to the specific embodiments described herein.

REFERENCE LIST

101 area of "good water quality"
102 increasing water quality factor (Q)=decreasing water quality
106 value pair Cl$_2$ max=0.6 mg/L and ORP=750 mV
109 area of "bad water quality"
110 reference or default characteristic curve for good water quality
120 sample curve for swimming pool water
122 characteristic chlorine redox curve with quality factor Q=2.2
133 characteristic chlorine redox curve with quality factor Q=3.3
165 exemplary characteristic curve for bad water quality
300 system for controlling disinfection in a water recirculation system
301 free chlorine sensor
302 oxidation-reduction potential (ORP) sensor
310 water body of swimming pool
311 measurement signal for free chlorine
312 measurement signal for the oxidation-reduction potential (ORP)
313 swimming pool
314 recirculation line
315 fluid flow direction from the pool
316 fluid flow direction back to the pool
321 chlorine disinfecting system/first disinfecting system
322 secondary disinfecting system
340 controller
348 display
350 control signal
351 recirculation pump
352 filtration unit
355 pump control signal
400 another system for controlling disinfection in a recirculating water system
401 measurement module comprising multisensor
410 water body of pool
413 swimming or spa pool
414 recirculation line
415 fluid flow direction in recirculation line from the pool
416 fluid flow direction in the return line back to the pool
417 return line
421 disinfecting system for dosing chlorine
422 pH controller
423 chloramine control unit
424 conductivity controller
425 control unit for standardized threshold values
426 flocculant controller
427 extension board
433 UV radiation system
434 PAC dosing system
435 filtration system
436 flocculation dosing module
437 heater
440 controller with processor(s) and display
441 ORP sensor
442 free chlorine sensor
443 pH sensor
444 temperature sensor
445 flow sensor
446 control unit for recirculation
447 combined chlorine sensor
448 measurement line
449 open drain
450 control unit
451 recirculation pump
452 conductivity sensor
453 control signal for disinfecting system for chlorine dosing
455 control line
456 signal line
457 feedback signal
458 digital input
500 method for controlling disinfection in recirculating water systems
520 determining at least one characteristic value
530 comparing predetermined threshold value to determined characteristic value
540 method step in which recirculation flow rate is increased
550 method step in which recirculation flow rate is decreased

The invention claimed is:

1. A method for controlling disinfection in a recirculating water system, the method comprising:
providing a controller comprising a processor for receiving a plurality of measurement signals of at least one water property sensor;
determining at least one characteristic value based on the measurement signals from at least one oxidation-reduction potential sensor and at least one free chlorine sensor, the characteristic value based at least in part on a chlorine redox relationship, the characteristic value comprising a quality factor determined by taking a square root of a ratio of measured free chlorine and an oxidation-reduction potential dependent chlorine reference value;
comparing said at least one characteristic value with at least one predetermined threshold value and continuously verifying whether the quality factor needs to be changed by regulation of a flow control device and/or a disinfecting system; and
regulating a water recirculation rate and/or a disinfectant level responsive to a verification that the quality factor needs to be changed.

2. The method according to claim 1, further comprising:
receiving chlorine reference values each with a corresponding reference oxidation-reduction potential value and storing the reference value pairs in a lookup table; and
based on a measured oxidation-reduction potential value, retrieving from the lookup table a corresponding chlorine reference value or a chlorine reference value determined by an interpolation algorithm of two neighboring chlorine reference values.

3. The method according to claim 1, further comprising determining a characteristic chlorine redox curve for the measured water by using, the quality factor and a mathematical formula, wherein the step of comparing comprises comparing the characteristic chlorine redox curve for the measured water to a predetermined chlorine redox curve of minimum water quality.

4. The method according to claim 1, wherein regulating comprises adjusting the water recirculation rate based on at least one characteristic value selected from a group comprising of a characteristic chlorine redox curve, a quality factor, and/or lookup tables.

5. The method according to claim 4, wherein adjusting the water recirculation rate is done automatically by means of a recirculation pump comprising frequency converters.

6. The method according to claim 1, wherein the step of regulating comprises controlling a disinfecting system to achieve a disinfectant concentration being greater than a predetermined lower threshold value and lower than a predetermined upper threshold value.

7. The method according to claim 1, wherein the disinfectant is chlorine, and wherein the step of regulating comprises controlling the recirculation rate and/or the introduction rate of chlorine to achieve a quality factor being smaller than 3.3 corresponding to a predetermined maximum free chlorine concentration of 0.6 mg/L and a desired oxidation-reduction potential of 750 mV.

8. The method according to claim 5, wherein the recirculation pump is controlled to decrease the recirculation rate if the determined quality factor is smaller than 2.2, corresponding to a predetermined minimum free chlorine concentration of 0.3 mg/L and a desired oxidation reduction potential of 750 mV.

9. The method according to claim 5, wherein the recirculation pump is controlled to decrease the recirculation rate if the determined quality factor is smaller than a quality factor corresponding to predetermined minimum or maximum free chlorine concentrations and a desired oxidized reduction potential.

10. A system for controlling disinfection in a recirculating water system comprising:
at least two water property sensors comprising an oxidation-reduction potential sensor and a free chlorine sensor;
a processor configured to determine based on measurements of the property sensors at least one characteristic value and to compare said at least one characteristic value with one or more predetermined threshold values, the at least one characteristic value comprising a quality factor based at least in part on a chlorine redox relationship and calculated by taking a square root of a ratio of measured free chlorine and an oxidation-reduction dependent chlorine reference value; and
a controller configured to regulate, based on the comparison value indicating a need for the quality factor to be changed, a recirculation rate by means of a flow control device and/or a disinfectant level by means of a disinfecting system.

11. The system according to claim 10, wherein the chlorine reference values and predetermined threshold are storable in a lookup table in a memory.

12. The system according to claim 10, wherein the predetermined values comprise a characteristic chlorine redox curve, the processor is configured to compare the characteristic chlorine redox curve for the measured water with a predetermined chlorine redox curve of minimum water quality.

13. The system according to claim 10, wherein the flow control device comprises a recirculation pump connected to the controller to receive control signals to regulate the water recirculation rate based on at least one characteristic value selected from a group comprising of a characteristic chlorine redox curve, a quality factor, and/or lookup tables.

14. The system according to claim 10, wherein the flow control device comprises a recirculation pump using a variable frequency drive to automatically adjust the flow rate.

15. The system according to claim 10, further comprising a pH sensor, wherein the control signal of the controller is further based on a pH value of the water.

16. The system according to claim 10, wherein the controller is configured to send control signals to a disinfecting system and/or to the flow control device to achieve a disinfectant concentration being greater than a predetermined lower threshold value and lower than a predetermined upper threshold value.

17. The system according to claim 10, wherein the disinfecting system is selected from the group comprising a dosing system of chlorine or a precursor thereof, a chlorine gas source, an electrolytic chlorine generator, a powdered activated carbon dosing system for adsorption of combined chlorine, an actinic radiation source, an ozonator or other oxidation source, or a combination thereof.

18. The system according to claim 10, wherein the disinfecting system is a chlorine dosing system being configured to regulate the introduction rate of chlorine to achieve a quality factor being smaller than 3.3, corresponding to a predetermined maximum free chlorine concentration of 0.6 mg/L and a desired oxidation reduction potential of 750 mV.

19. The system according to claim 10, further comprising a recirculation pump configured to decrease the recirculation rate if the quality factor is smaller than 2.2, corresponding to a predetermined minimum free chlorine concentration of 0.3 mg/L and a desired oxidation reduction potential of 750 mV.

20. The system according to claim 10, further comprising at least one water property sensor selected from the group comprising a sensor for total chlorine or combined chlorine, a conductivity sensor, a total dissolved solids sensor, a turbidity sensor, a temperature sensor, a pressure sensor, or a saturation index sensor.

21. The system of claim 10, further comprising:
a swimming pool or a spa pool;

wherein the recirculation rate is regulated by a recirculation pump which is configured to withdraw water from the swimming pool or spa pool and, after passing at least one disinfecting module, return water to the swimming pool or spa pool via a recirculation line;

a water property measurement module comprising the oxidation-reduction potential sensor and free chlorine sensor; and a display being configured to show at least one of the sensor signals and a plot of a characteristic curve based at least in part on water property measurements.

22. The system of claim 21, wherein the system further comprises:

at least one treatment module comprising a flocculant dosing system and a filtration unit downstream thereof;

a heating system;

a module for reduction of combined chlorine; and a module for pH correction.

23. A system for controlling disinfection in a recirculating water system comprising:

a swimming pool or a spa pool;

at least two water property sensors comprising an oxidation-reduction potential sensor and a free chlorine sensor;

a water property measurement module comprising the oxidation-reduction potential sensor and free chlorine sensor;

a processor configured to determine based on measurements of the property sensors at least one characteristic value and to compare said at least one characteristic value with one or more predetermined threshold values;

a controller configured to regulate, responsive to the comparison value indicating a need for the at least one characteristic value to be changed, a recirculation rate by means of a flow control device and/or a disinfectant level by means of a disinfecting system, the recirculation rate regulated by a recirculation pump which is configured to withdraw water from the swimming pool or spa pool and, after passing at least one disinfecting module, return water to the swimming pool or spa pool via a recirculation line;

a display configured to show at least one of the sensor signals and a plot of a characteristic curve based at least in part on water property measurements;

at least one treatment module comprising a flocculant dosing system and a filtration unit downstream thereof;

a heating system;

a module for reduction of combined chlorine; and a module for pH correction.

* * * * *